United States Patent [19]

Bogan et al.

[11] 4,028,436

[45] June 7, 1977

[54] MELT PHASE PROCESS FOR THE PREPARATION OF EMULSIFIABLE POLYETHYLENE WAXES

[75] Inventors: Richard T. Bogan; Claude M. Shelton, both of Kingsport, Tenn.

[73] Assignee: Eastman Kodak Company, Rochester, N.Y.

[22] Filed: Apr. 1, 1975

[21] Appl. No.: 563,992

[52] U.S. Cl. .................. 260/878 R; 260/78.41; 526/19; 526/56; 526/272; 526/317
[51] Int. Cl.² ............... C08L 23/26; C08F 255/02; C08F 222/06; C08F 222/00
[58] Field of Search ............ 260/878 R, 94.9 GC, 260/94.9 GA, 78.4 D, 78.5 HC

[56] References Cited

UNITED STATES PATENTS

| | | | |
|---|---|---|---|
| 3,201,381 | 8/1965 | Hagemeyer, Jr. et al. | 260/94.9 GC |
| 3,278,513 | 10/1966 | Jahrstorfer et al. | 260/94.9 GC |
| 3,285,902 | 11/1966 | Schmeidl | 260/94.9 GC |
| 3,433,777 | 3/1969 | Brunson | 260/88.2 F |
| 3,519,609 | 7/1970 | McConnell et al. | 260/94.9 GC |
| 3,859,385 | 1/1975 | Mainord | 260/94.9 GC |
| 3,859,386 | 1/1975 | Mainord | 260/78.4 D; 94.9 GC |
| 3,892,717 | 7/1975 | Mori et al. | 260/94.9 GC |

OTHER PUBLICATIONS

Brunson, Def. Pub. of Serial No. 828,807 Filed 5/26/69, published in 869 O.G. 713, on 12/16/69, Def. Pub. No. T869,011.

*Primary Examiner*—Alan Holler
*Attorney, Agent, or Firm*—Clyde L. Tootle; Daniel B. Reece III

[57] ABSTRACT

A melt phase process for the preparation of emulsifiable polyethylene waxes by reacting polyethylene waxes with an unsaturated polycarboxylic component in the presence of a free radical source in the substantial absence of oxygen.

12 Claims, No Drawings

MELT PHASE PROCESS FOR THE PREPARATION OF EMULSIFIABLE POLYETHYLENE WAXES

This invention relates to modified polyethylene waxes having improved physical properties and the process for preparation thereof. One of the aspects of this invention concerns a melt phase process for preparing emulsifiable low molecular weight polyethylene compositions. Another aspect of this invention concerns the novel reaction product prepared by reacting low viscosity polyethylene and unsaturated polycarboxylic compounds in the presence of a free radical source and in the substantial absence of oxygen.

It is known in the art to react poly-α-olefin compounds with polycarboxylic compounds. However, the teachings of the prior art are directed to reacting polyethylene with polycarboxylic acids in the absence of a free radical initiator or catalyst, such as a peroxide. Heretofore, attempts to react polyethylene with unsaturated polycarboxylic acids in the presence of peroxides provided only insoluble crosslinked unemulsifiable material. Therefore, it was believed necessary to carry out the reaction of low viscosity polyethylenes with unsaturated polycarboxylic acids in a solvent and at elevated temperatures. While this type reaction provided modified polyethylenes which were emulsifiable and useful as waxes, these waxes generally have a yellow or orange color. This color problem prevented these waxes from being useful in applications where an emulsifiable wax was necessary which was clear or water white in appearance. Moreover, the use of a solvent was an additional expense as well as required the recovery of the modified polyethylene from the reaction mixture. It would therefore be an advance in the state of the art to provide a melt phase process for preparing emulsifiable polyethylene waxes by reacting a polyethylene wax with a polycarboxylic acid in the presence of a free radical source to provide a modified polyethylene emulsifiable wax which had a clear or water white color.

Accordingly, it is one of the objects of the invention to provide a novel process for preparing polyethylene wax compositions having improved physical properties.

Another object of this invention is to provide polyethylene wax compositions having high softening points.

A further object of the invention is to provide an emulsifiable polyethylene wax composition.

Still another object of the invention is to prepare low molecular weight polyethylene wax compositions exhibiting high hardness properties.

A still further object of this invention is to improve the emulsifiability of unemulsifiable polyethylene compositions by reacting the unemulsifiable compound with unsaturated polycarboxylic compounds.

Another object is to provide a process for producing polyethylene compounds having good color and which are readily emulsifiable.

A further object is to provide polyethylene emulsions which are clear and stable.

Further objects and advantages of the invention will be apparent to those skilled in the art from the accompanying disclosure and claims.

In accordance with this invention, it has been found that low viscosity polyethylene waxes can be modified to produce emulsifiable polyethylene waxes having improved physical and chemical properties by reacting such waxes with organic unsaturated polycarboxylic acids, acid anhydrides and acid esters derived therefrom in the presence of a free radical source and in the substantial absence of oxygen, e.e., less than 5 ppm. of oxygen. These modified polyethylene wax materials are of low molecular weight and emulsifiable in both nonionic and anionic emulsification systems.

The starting low viscosity polyethylene waxes which are useful in this invention are characterized by having a melt viscosity of less than about 200 to 600 cp. as measured at 125° C. (ASTM-modified D1824) and a density of 0.92 to 0.95. The waxes are reacted with unsaturated polycarboxylic acid compound at temperatures from 200°–250° C., preferably between 210° C. and 240° C., in the presence of a free radical source and in the substantial absence of oxygen.

It is essential to rigorously exclude air ($O_2$) from the reaction vessel (i.e., to less than 5 ppm. $O_2$ and preferably to about 2 ppm. $O_2$) to minimize crosslinking of the polyethylene and to obtain products which are not highly discolored, i.e., have a Gardner color of 7 or less. Herefore, in the maleation of polypropylene wax, as for example in Example 2 of U.S. Pat. No. 3,480,580, the reaction mixture was purged with nitrogen, but no attemps were made to rigorously exclude air. Also, it is recognized that the presence of air is not highly disadvantageous, except for discoloration of the product, in the maleation of polypropylene, since polypropylene generally decreases in molecular weight rather than crossliks in the presence of a peroxide. In a solvent-based maleation of low molecular weight polyethylene, it was recognized that it was preferable to operate in a suitable inert atmosphere, such as nitrogen, but the criticality of removing all air has not heretofore been recognized. Moreover, Example D of Defensive Publication T914,008 describes a peroxide-initiated melt-phase maleation of a low viscosity polyethylene. In this example, 100 grams of polyethylene (density 0.906; inherent viscosity of 0.34 in Tetralin and a melt viscosity of 4000 cp. at 190° C.) was treated with 0.25 g. of di-tert-butyl peroxide and 2.5 g. of maleic anhydride, but no attempt was made to remove air from the reaction vessel. Within 30 minutes, the reaction mixture was crosslinked and the crosslinked polymer was insoluble in Tetralin. The maleated polyethylene products obtained by the prior art melt-phase processes are therefore not compatible with semiclear polishes since the high saponification numbers needed, greater than 45, cannot be obtained without concomitant crosslinking of the polyethylene. Moreover, these materials are often highly discolored and as such they would not be suitable as wax components in floor polish formulations.

The novel emulsifiable polyethylene wax compositions of this invention can be prepared from low viscosity polyethylenes which are prepared by thermally degrading conventional high molecular weight, high, medium and low density polyethylene polymers prepared by conventional polymerization processes. These high molecular weight polyethylene polymers can have a density of from about 0.90 to about 0.976 and an inherent viscosity of from 0.1 to 2.0 in tetralin at 145° C. The thermal degradation of these conventional high molecular weight polyethylene polymers can be accomplished by heating at elevated temperatures causing the polymer chain to rupture apparently at the points of chain branching of the polymeric material. The degree of degradation is controlled by reaction time and temperature to give a thermally degraded low molecular weight polyethylene wax polymeric material having a melt viscosity range from about 200–600 cp. at 125° C. (ASTM-Modified D-1824) and an inherent viscosity of about 0.05 to 0.5, [Schulken and Sparks, Journal Polymer Science 26 227, (1957)]. By carefully controlling the time, temperature and agitation, a thermally degraded polyethylene of relatively narrower molecular weight range than the starting high molecular weight polymer is obtained. The degradation is carried out at a temperature from 290° C. to about 425° C. The degraded polyethylene waxes can be hydrogenated by conventional means to improve color and reduce odor. These low viscosity polyethylene waxes prepared by thermally degrading conventional high molecular weight polymers are not emulsifiable as such, but upon reacting them with unsaturated polycarboxylic acids, anhydrides or esters thereof, thereby increasing the acid number and saponification number of the thermally degraded wax, become emulsifiable.

The low viscosity polyethylene waxes having a melt viscosity of less than about 200 to 600 cp. as measured at 125° C. (ASTM-modified D-1824) are reacted with unsaturated polycarboxylic acids, anhydrides or esters thereof at temperatures from about 200° C. to 250° C., preferably from about 210°–240° C., in the presence of free radical sources. Suitable free radical sources are, for example, peroxides having decomposition rates such that the half life of the catalyst is equal to or greater than 0.1 second at the reaction temperature. Such preferred peroxides are ditertiary butyl peroxide and 2,5-dimethyl-2,5-di(tert-butyl peroxy)hexane. However, peroxides such as tertiary butyl hydroperoxide, cumene hydroperoxide, p-methane peroxide, p-methane hydroperoxide compounds can be used as well as other free radical sources such as azo compounds, such as azobis(isobutyronitrile), or irradiation sources. Suitable irradiation sources include, for example, those from cobalt, and the like and ultraviolet light. The amount of peroxide or free radical agent used is generally quite low being preferably of the order of about 0.2 to about 3.0% based on the weight of the low viscosity poly-α-olefin. The reaction may be carried out either in a batchwise or in a continuous manner with contact times in the order of about 10 minutes to about 2 hours.

Suitable unsaturated polycarboxylic acids and anhydrides are, for example, maleic acid, maleic anhydride, fumaric acid, citraconic anhydride, aconitic anhydride and itaconic anhydride. Suitable esters are, for example, that half or full esters derived from methyl, ethyl, dimethyl maleate, dimethyl fumarate, methyl ethyl maleate, dibutyl maleate, dipropyl maleate, and the like, or those compounds which form these compounds at elevated reaction temperatures such as citric acid, for example. Preferably, about 3 to 15% unsaturated polycarboxylic acid, anhydride or esters thereof, based on the weight of the low viscosity polyolefin, can be used in the invention. These modified low molecular weight polyethylene waxes have a melt viscosity of 1000 to 6000 centipoise at 125° C. and a saponification number of at least 45 to about 80, preferably about 50–75, and a Gardner color of 7 or less. The saponification number can be modified by the amount of unsaturated polycarboxylic component, the reaction temperature and time. It has been observed that the melt viscosity of the modified polyethylene product increases slightly. This increase in melt viscosity may be due to copolymerization of the wax material with maleic anhydride.

One method for the determination of saponification number of maleated polyethylene is as follows: Weigh approximately 4 g. of the sample into a 500 ml. alkali-resistant Erlenmeyer flask and add 100 ml. distilled xylene. Heat under a reflux condenser for 1 hour. Cool the solution to 75° C. or less, and add from a buret 30 ml. standardized 0.10 N KOH in ethyl alcohol. Heat under reflux for 45 min. Cool, and add from a buret standardized 0.10 N $CH_3COOH$ in xylene until the mixture is acid to phenolphthalein. Add at least 1 ml. excess $CH_3COOH$. Reheat the solution under reflux for 15 min. Remove from heat, add 5 ml. water, and titrate to a faint pink end point with 0.10 N KOH in ethyl alcohol. Run a blank in this manner using the same amounts of reagents and the same heating times.

Calculation:

$$\frac{[(ml. \ KOH \times N) - (ml. \ CH_3COOH \times N)]^{(for \ sample)} - [(ml. \ KOH \times N) - (ml. \ CH_3COOH \times N)]^{(for \ blank)} \times 56.1}{g. \ Sample} = Sap.No.$$

The unreacted, unsaturated polycarboxylic acid can be separated from the reaction mixture by purging the reaction mixture with an inert gas while the melt temperature is between 200° and 300° C. After the unreacted unsaturated polycarboxylic acid has been removed, the modified poly-α-olefin can be further purified by vacuum stripping, solvent extraction, or dissolving in an aqueous medium and isolated by removing the solvent or water.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A 500-ml., three-necked flask is fitted with a True Bore stirrer, a condenser, and a pressure equalizing dropping funnel having a nitrogen gas inlet. The flask is charged with 150 g. of thermally degraded polyethylene (density of 0.927 and a melt viscosity of 230 cp. at 125° C.) before being immersed in a Newton's metal bath maintained at 225° C. The reaction flask is evacuated and maintained at reduced pressure until the polymer melt is fully degassed. Then, the reaction flask is filled with nitrogen and subsequently evacuated a second time. This procedure is repeated as many as three or four times. The dropping funnel is charged under nitrogen with 1.36 g. (3.14 mmoles/100 g. of polymer) of 2,5-dimethyl-2,5-di(t-butylperoxy)hexane and 15 g. (10% based on polymer) of maleic anhydride dissolved in 25 ml. of acetone. The polymer melt is stirred rigorously (≃250 r.p.m.) while steam is passed through the condenser to return maleic anhydride which boils out of the reaction mixture. Then, the contents of the dropping funnel are added dropwise over a 20- to 30-min. period and stirring is continued for 10 minutes after complete addition of the acetone solution. The molten reaction mixture is poured into two large test tubes and the maleated polymer is vacuum stripped (<1 mm. Hg) in a sand bath (≃200° C.) for 2 hours to remove any unreacted maleic anhydride from the product. The maleated polymer has a saponification number of 68 and its melt viscosity is 3200 cp. at 125° C. A nonionic emulsion is prepared with 40 g. of polymer, 10 g. of a surfactant such as Igepal CO-530, 4 g. of 2-diethylaminoethanol and 150 ml. of water using a wax-to-water method. The nonionic emulsion has good clarity, excellent color (Gardner 3-4) and is nonviscous.

Similar emulsions are obtained using conventional emulsification procedures with modified polyethylenes prepared from degraded polyethylenes having a density of 0.92 to 0.95 and a melt viscosity of 200 to 600 cp. at 125° C. (ASTM-modified D-1824).

EXAMPLE 2

The procedure of Example 1 is repeated, but the flask is charged with 100 g. of degraded polyethylene (density 0.927 and a melt viscosity of 230 cp. at 125° C.) and an acetone solution containing 0.725 g. (2.5 mmoles/100 g. of polymer) of 2,5-dimethyl-2,5-di(t-butyl-peroxy) hexan and 8 g. (8%) of maleic anhydride is added. The maleated product has a saponification number of 60 and a melt viscosity of 1025 cp. at 125° C. An anionic emulsion is prepared with 40 g. of polymer, 7 g. of morpholine, 7 g. of oleic acid and 150 ml. of water using a wax-to-water method. The anionic emulsion has good clarity, a Gardner color of 4 and is nonviscous.

EXAMPLE 3

The procedure of Edample 1 is repeated, but the reaction temperature is 240° C. and the flask is charged with 100 g. of the degraded polyethylene used in Example 2. An acetone solution containing 0.725 g. (2.5 mmoles/100 g. of polymer) of 2,5-dimethyl-2,5-di(t-butyl-peroxy) hexane and 8 g. (8%) of maleic anhydride is added. The melt stripped product has a saponification number of 60 and a melt viscosity of 800 cp. at 125° C. The nonionic emulsion made according to Example 1 from the product is clear, has a Gardner color of 6 and is nonviscous.

EXAMPLE 4

The procedure of Example 1 is repeated, but the reaction temperature is 200° C. The degraded polyethylene wax is reacted with maleic anhydride (6%) and 2,5-dimethyl-2,5-di(t-butylperoxy)hexane (1.72 mmoles/100 g. of polymer) to provide a product having a saponification number of 47 and a melt viscosity of 5000 cp. at 125° C. A second reaction is carried out using 8% maleic anhydride and 2.5 g. moles of 2,5-dimethyl-2,5-di-(t-butylperoxy)hexane. The product obtained has a saponification number of 60 and a melt viscosity of 9000 cp. at 125° C. The nonionic emulsions made from each of the products were translucent and slightly viscous. Thus, products prepared at temperatures above 200° C. are generally more easily emulsified than those prepared at 200° C.

EXAMPLE 5

The procedure of Example 1 is repeated, but the reaction vessel is charged with 100 g. of the degraded polyethylene wax used in Example 1 and an acetone solution containing 0.91 g. (6.2 moles/100 g. of polymer) di-t-butyl-peroxide and 10 g. (10%) of maleic anhydride is added. The product has a saponification number of 59 and a melt viscosity of 2800 cp. at 125° C.

EXAMPLE 6

The procedure of Example 1 is repeated, but the reaction flask is charged with 150 g. of the degraded polyethylene wax having a density of 0.927 and a melt viscosity of 500 cp. at 125° C. and an acetone solution containing 1.09 g. (2.5 mmoles/100 g. of polymer) of 2,5-dimethyl-2,5-di(t-butylperoxy)hexane and 12 g. (18%) of maleic anhydride is added. The product has a saponification number of 54 and a melt viscosity of 6000 cp. at 125° C. A nonionic emulsion made from the product has good clarity and is nonviscous. Thus, other low molecular weight polyethylene waxes similar to the low viscosity polyethylene waxes of this example are useful in the practice of this invention.

EXAMPLE 7

The procedure of Example 1 is repeated, but no effort is made to completely exclude air ($O_2$) from the reaction mixture. Instead, the reaction mixture is merely purged with nitrogen. The flask is charged with 100 g. of degraded polyethylene having a density of 0.927 and a melt viscosity of 500 cp. at 125° C., and an acetone solution containing 0.725 g. (2.5 mmoles/100 g. of polymer) of 2,5-dimethyl-2,5-di(t-butyl-peroxy)-hexane and 8 g. (8%) of maleic anhydride is added. The maleated product has a saponification number of 46 and a melt viscosity of 33,750 cp. at 125° C. The very viscous reaction product is heated to 125° C. in an effort to prepare a wax-to-water emulsion. Polymer gel formation is evident in the product and no further attempt is made to emulsify the graft copolymer. This example demonstrates that it is critical that all air be eliminated from the reaction mixture and that merely purging the reaction mass with $N_2$ without removing residual air is ineffective in controlling the melt viscosity of the product.

EXAMPLE 8

Using a standard wax-to-water emulsification procedure, 40 parts by weight of each of five different maleated polyethylene waxes prepared according to the present invention are combined with 10 parts surfactant such as Igepal CO-530, 4 parts 2-diethylaminoethanol and 150 ml. of water. The resulting water-clear emulsions contain approximately 25% solids by weight (Table 1). Similarly, other emulsions are prepared using ethylene acrylic acid copolymers having acid numbers of 40 and 75 and an oxidized low density polyethylene polymer having an acid number of 15 and a melt viscosity of 1200 cp. at 125° C. (Table 1). The eight water-clear emulsions are used in preparing semiclear floor polishes. These formulations consist of 75 parts polymeric hardening agent, 15 parts leveling resin, 10 parts of the emulsion containing 2 parts modified polyethylene prepared according to the present invention, 2 parts coalescing aid and 1.5 parts plasticizer. The stability of the wax in the floor polish is determined by aging the formulations at 140° F. for 4 weeks. The stable formulations, which contain maleated polyethylene waxes having saponification numbers greater than 50, show no evidence of precipitation and retain virtually all of the original clarity during the aging test (Table 1). Thus, these maleated polyethylene waxes have excellent stability in semiclear floor polish formulations. Prior art emulsifiable polymers such as oxidized low density polyethylenes or ethylene acrylic acid copolymers having acid numbers as high as 75 are not compatible with semiclear floor polishes.

TABLE I

Stability of Various Waxes in Semiclear Floor Polish Formulations

| Wax Component | Sap. No. | Acid No. | Melt Viscosity cp. (Temp.) | Stable in Floor Polish 4 weeks, 140° F.[a] |
|---|---|---|---|---|
| Maleated Polyethylene | 25 | — | 400 (125° C.) | Unstable |
| Maleated Polyethylene | 42 | — | 800 (125° C.) | Unstable |
| Maleated Polyethylene | 58 | — | 1500 (125° C.) | Stable |
| Maleated Polyethylene | 68 | — | 3200 (125° C.) | Stable |
| Maleated Polyethylene | 75 | — | 5400 (125° C.) | Stable |
| Oxidized Polyethylene | — | 15 | 1200 (125° C.) | Unstable |
| EAA Copolymer[b] | — | 40 | 500 (140° C.) | Unstable |
| EAA Copolymer[c] | — | 75 | 650 (140° C.) | Unstable |

[a]Formulation consisted of 75 parts by weight Richamer R-800 polymer hardener, 15 parts by weight SMA 2625A leveling resin (15% solids), 10 parts by weight polyethylene or ethylene/acrylic acid emulsion, 2 parts by weight Ektasolve DE coalescing aid, 1.5 parts by weight tributoxy ethyl phosphate plasticizer.
[b]EAA copolymer is a commercially available ethylene/acrylic acid copolymer sold by Allied Chemical Company as AC-540.
[c]EAA copolymer is a commercially available ethylene/acrylic acid copolymer sold by Allied Chemical Company as AC-580.

As described hereinabove, this invention consists of a novel process and a new and novel modified low molecular weight polyethylene wax composition which comprises reacting low viscosity polymers prepared from high molecular weight polyethylene with an unsaturated polycarboxylic acid, anhydride or ester thereof to prepare an emulsifiable modified polyethylene wax having a melt viscosity of 1000–6000 centipoise at 125° C. and a saponification number of at least 45, preferably 50–75, and a Gardner color of 7 or less.

It was completely unexpected that a process as disclosed in the present application would be operable to provide emulsifiable low molecular weight polymeric materials since reacting polyethylene waxes, or low viscosity polyethylene with maleic anhydride in the presence of a free radical component, such as a peroxide, produces an insoluble and unemulsifiable crosslinked product. Moreover, reacting monomeric olefinic materials such as 1-octene with maleic anhydride in the presence of a peroxide forms alternating copolymers.

The modified low molecular weight poly-α-olefin compositions of this invention are useful for many purposes including preparing nonionic and anionic emulsions which are excellent textile-treating agents which improve the scuff resistance of fabrics such as permanently creased cotton fabrics. The emulsions are also useful in floor polish compositions providing scuff resistant, hard, glossy finishes.

The invention has been described in considerable detail with particular reference to preferred embodiments thereof, but it will be understood that variations and modifications can be effected within the spirit and scope of the invention.

We claim:

1. A process for the preparation of an emulsifiable modified polyethylene composition which comprises reacting in the melt phase process at a temperature of from 200° to 250° C. in the presence of a free radical source and in the presence of less than 5 ppm of oxygen (1) low viscosity polyethylene waxes having a melt viscosity of from about 200 to 600 cp. as measured at 125° C. with (2) at least one unsaturated polycarboxylic component selected from the group consisting of maleic acid, maleic anhydride, fumaric acid, citraconic anhydride and half esters derived from maleic and fumaric acids.

2. A process for the prepartion of an emulsifiable modified polyethylene composition according to claim 1 wherein said low viscosity polyethylene wax is a thermally degraded polyethylene wax.

3. A process for the preparation of an emulsifiable modified polyethylene composition according to claim 2 wherein said unsaturated polycarboxylic component is maleic anhydride.

4. A process for the preparation of an emulsifiable modified polyethylene composition which comprises reacting in a melt phase process at a temperature of from 210° to 240° C. in the presence of a free radical source and in the presence of less than 2 ppm of oxygen (1) low viscosity polyethylene waxes having a melt viscosity of from about 200 to 600 cp. as measured at 125° C. with (2) at least one unsaturated polycarboxylic component selected from group consisting of maleic acid, maleic anhydride, fumaric acid, citraconic anhydride and half esters derived from maleic and fumaric acids.

5. A process for the preparation of an emulsifiable modified polyethylene composition according to claim 4 wherein said low viscosity polyethylene wax is a thermally degraded polyethylene wax.

6. A process for the preparation of an emulsifiable modified polyethylene composition according to claim 5 wherein said unsaturated polycarboxylic component is maleic anhydride.

7. An emulsifiable modified polyethylene composition prepared by reacting in a melt phase process at a temperature of from 200° to 250° C. in the presence of a free radical source and in the presence of less than 5 ppm of oxygen (1) low viscosity polyethylene waxes having a melt viscosity of from about 200 to 600 cp. as measured at 125° C. with (2) at least one unsaturated polycarboxylic component selected from the group consisting of maleic acid, maleic anhydride, fumaric acid, citraconic anhydride and half esters derived from maleic and fumaric acids.

8. An emulsifiable modified polyethylene composition prepared according to claim 7 wherein said low viscosity polyethylene wax is a thermally degraded polyethylene wax.

9. An emulsifiable modified polyethylene composition prepared according to claim 8 wherein said unsaturated polycarboxylic component is maleic anhydride.

10. An emulsifiable modified polyethylene composition prepared by reacting in a melt phase process at a temperature of from 210° to 240° C. in the presence of a free radical source and in the presence of less than 2 ppm of oxygen (1) low viscosity polyethylene waxes having a melt viscosity of from about 200 to 600 cp. as measured at 125° C. with (2) at least one unsaturated polycarboxylic component selected from the group consisting of maleic acid, maleic anhydride, fumaric acid, citraconic anhydride and half esters derived from maleic and fumaric acids.

11. An emulsifiable modified polyethylene composition prepared according to claim 10 wherein said low viscosity polyethylene wax is a thermally degraded polyethylene wax.

12. An emulsifiable modified polyethylene composition prepared according to claim 11 wherein said unsaturated polycarboxylic component is maleic anhydride.

* * * * *